Patented May 20, 1952

2,597,432

UNITED STATES PATENT OFFICE 2,597,432

ACETYL GLOBIN AND PROCESS OF PREPARATION

Herman N. Beniams, Berkeley, Calif., assignor to Cutter Laboratories, Berkeley, Calif., a corporation of California No Drawing. Application January 12, 1951,
Serial No. 205,827

6 Claims. (Cl. 260—112)

This invention relates to blood fractions and in general has for its object the provision of a soluble acetyl globin suitable in one form as an osmotic agent and in another form as a nitrogenous nutrient, and methods for preparing these products.

It is frequently desirable in parenteral therapy to introduce into the circulatory system a protein which will remain in the plasma component of the circulation and which will be suitable for exerting plasma osmotic pressure.

Human whole blood contains about four times as much protein in the form of hemoglobin as in the form of plasma proteins but at present most of the hemoglobin is discarded or wasted during the preparation of plasma and plasma fractions, the reason for this being that no entirely satisfactory method has been available for converting hemoglobin into therapeutically useful products.

More specifically, although hemoglobin is normally present within the red blood cells, when released therefrom, it is immediately detoxified in the liver, the resulting degradation products being excreted. Any extra-cellular hemoglobin introduced into the circulatory system is likewise acted upon by the liver and if large amounts thereof are administered intravenously, severe damage to the liver and kidney results.

One of the objects of this invention is, therefore, the provision of a method of converting the heretofore wasted hemoglobin fraction of whole human blood into a modified globin which is soluble within a neutral pH range, more specifically an acetyl globin.

Hemoglobin is a so-called conjugated protein, made up of a protein part called globin, and a non-protein prosthetic group, called heme. Heme may be removed from the globin by several methods described in the literature. For example, heme and globin may be separated from hemaglobin by the method of Anson and Mirsky (Journal of General Physiology 13; p. 469). However, the resulting globin is largely insoluble in an aqueous medium at pH values near neutrality. It is readily soluble at pH values below about 6.7 and above about 9.5, but is largely insoluble within this pH range. A small portion representing about twenty per cent of the Anson and Mirsky globin is soluble near neutrality, the portion soluble depending on the conditions of neutralization, but this fraction is very unstable and gradually precipitates from solution. Solutions for parenteral administration must be nearly neutral, especially if they possess appreciable buffer capacity as do protein solutions. Obviously, therefore, a globin solution suitable for parenteral use could not be prepared without first appropriately modifying the globin in such a way as to render it soluble and stable in neutral or nearly neutral solution.

There are two commonly known methods for rendering acid globin (Anson and Mirsky globin) soluble at neutral pH values and these two methods will be described.

A portion of the acid globin which is in solution as the globin-hydrochloride at low pH values remains in solution when the solution is neutralized very slowly. This leads to the so-called renatured globin of Anson and Mirsky which is very unstable in solution and gradually precipitates, even in the cold. It is also highly toxic upon parenteral administration. Whether this toxicity is due to the renatured globin per se, or to some toxic impurities from the red cells apparently is not known at this time. This type of preparation, however, is therapeutically unsatisfactory.

The second method referred to was devised by Strumia (U. S. Patent No. 2,460,550). This method involves a mild heat treatment in a strongly alkaline solution. A pH in the neighborhood of 12 appears to be necessary, although the patent mentions pH values of 9 or above. Strumia states that this alkaline heat treatment reduces the molecular weight of the globin to about one-half the molecular weight of the original globin, and reduces the pH at which globin precipitates to a pH value below 6.8. He further states that the globin prepared in this manner has an average molecular weight of approximately 34,000. Although not detracting from the practical results obtained by the Strumia alkaline heat treatment, it should be pointed out that Strumia's concept of what occurs is apparently erroneous. Gralen, in the Biochemical Journal 33; page 1907 (1939), has determined the molecular weight of the Anson and Mirsky renatured globin described above and has reported this to be 34,000. It is true that the globin portion of hemoglobin accounts for a molecular weight of 68,000, but it so happens that when hemoglobin is split into heme and globin, two globin molecules are produced, each exhibiting a molecular weight of 34,000 before any alkaline heat treatment is employed. Treatment with alkali is known to grossly modify proteins and under the conditions of heat and alkalinity described by Strumia there occur various degrees of degradation of the globin. Some of the amide linkages are ruptured with the consequent release of ammonia. This would be expected to result in a more acidic or less basic protein, which would therefore possess a lowered isoelectric point and a lower pH range of insolubility. It is easily seen that the removal of amide groups from a protein would lower the pH range within which the protein is insoluble, and would cause a protein with an original isoelectric point near neutrality to become soluble near neutrality. In fact, I have determined that the Strumia process of heat and alkali treatment, when applied to globin, releases about 2 per cent of the total nitrogen in the form of ammonia which is gradually removed at the temperature which is employed. In addition, alkalies hydrolyze many other linkages in proteins besides amide linkages. The alkaline treatment is not at all specific and results in various side reactions, which are associated with an observable degradation and decreased electrophoretic homogeneity.

My method for achieving solubility by forming an acetyl globin is on the other hand highly specific. The process very probably results almost exclusively in the blocking of primary amino groups with no non-specific side reactions resulting in degradation or gross modification. Other characteristics of the globin are consequently not modified. Acetylation, carried out specifically for solubilization of the globin, may be combined of course with other treatments, such as dialysis and reprecipitation, to increase its purity in order to achieve a final product possessing satisfactory properties.

An isoelectric protein molecule in solution possesses an average total electric charge of zero. That is, equal numbers of positive and negative charges are present over a time average. These charges consist largely of ionized amino groups which are positive and ionized carboxyl groups which are negative. If some or all of the amino groups are blocked by acetylation with the formation of much less basic substituted amide groups, there should remain a preponderance of negative charges at the same pH value because of the unchanged ionized carboxyl groups. The acetylated protein would be, therefore, above its isoelectric point if in a medium of the initial constant pH. Before acetylation, globin is largely insoluble within the approximate pH range of 6.7 to 9.5. Acetylation, by lowering the isoelectric point, lowers the pH region within which the protein is insoluble. Acetylation, therefore, renders the globin soluble near neutrality, this having been amply demonstrated experimentally.

Briefly, the acetylation of globin in accordance with the method of the present invention can be effected by periodically adding increments of acetic anhydride to an aqueous globin suspension and immediately after each such addition adjusting the hydrogen ion concentration of the suspension to about pH 8 by the addition of a suitable base, this two-step cycle of operation being carried out within a temperature range of 0°–3° C. and repeated until a substantially clear solution is obtained. Upon each addition of acetic anhydride, only a portion thereof reacts with the globin to form acetyl globin, the remainder being hydrolyzed to form acetic acid which, in turn, decreases the pH of the suspension and necessitates the immediate adjustment of the hydrogen ion concentration. It is for this reason that the acetylation of the globin is best effected step by step.

More specifically and by way of example, the above reactions can be resorted to as follows for the purpose of preparing an acetyl globin soluble within the required pH range: Globin hydrochloride is first prepared by following exactly the acid acetone method of Anson and Mirsky. In order to obtain a final product free of toxic principles, it is advisable to remove all of the stroma proteins from the hemoglobin solution before preparing the Anson and Mirsky globin. The stroma can be removed by adjusting the pH value of the hemoglobin solution to within the range of 5.5 to 6.0 and then either filtering or centrifuging very meticulously. The stroma is thereby removed as a precipitate and accounts for approximately 5.2 percent of the total solids. Seventy grams of the stroma-free Anson and Mirsky globin hydrochloride are mixed with one liter of cold distilled water. When the globin is completely dissolved the mixture is cooled to between 0° and 3° C. The solution is stirred mechanically and the electrodes of a pH meter are arranged so that pH readings can be made directly without removing samples. Approximately one normal sodium hydroxide is added until pH 8.0 is reached. Precipitation begins at about pH 6.7 and a heavy slurry of precipitated globin forms upon approaching pH 8.0. For this purpose, approximately 60 ml. of sodium hydroxide solution are required. Acetic anhydride is then added in one ml. portions, a total of 8 ml. being required to effect solubility. The portions are added at approximately ten-minute intervals. Immediately after each addition of acetic anhydride, the pH begins to drop rapidly due to the formation of acetic acid by the hydrolysis of acetic anhydride. One normal sodium hydroxide solution is therefore added after each addition of acetic anhydride in order to maintain the pH near 8 most of the time. The pH may at times fall as low as 6.0, but if it is quickly readjusted these wide fluctuations do not seem to result in any damage. However, the pH must be readjusted to within the range of 7.7 to 8.3 before each subsequent addition of acetic anhydride. The temperature is maintained between 0° and 3° C. at all times. The slurry gradually becomes less heavy and, after the sixth or seventh addition of acetic anhydride, very little suspended material remains. These steps can, of course, be carried out in the presence of a buffer to minimize pH variations. After the final addition, the solution becomes perfectly clear. The sodium acetate formed during the above reaction is eliminated by dialysis, or by precipitating the acetylated globin at approximately pH 5.5 The final salt-free acetylated globin can be dried by vacuum from the frozen state if desired, or the final salt-free acetylated globin precipitate can be redissolved in water or buffer to form more concentrated solutions. In any event, this product is suitable for preparing neutral solutions of high colloid osmotic activity.

The acetyl globin as above prepared exhibits an electrophoretic mobility between $5.0 \times 10^{-5}$ and $6.0 \times 10^{-5}$ cm.$^2$/sec./volt in a pH 8.6 Veronal buffer. The electrophoretic peak is sharp and uniform, showing a high degree of homogeneity. Furthermore, I have determined that in an acetyl globin of this character each molecule contains on an average of at least seven acetyl groups, this being essential to a product soluble at pH 7.

If it is desired to prepare a soluble globin of smaller molecular weight, it is only necessary to hydrolyze the globin into smaller molecules either before or after the globin has been acetylated. For this purpose, any suitable procedure can be resorted to. The hydrolyzed fraction, like the unhydrolyzed fraction, is soluble at pH 7.4 and contains on an average of at least seven acetyl groups per molecule of the unhydrolyzed globin.

Having thus described my invention, what I claim and desire to secure by Letters Patent is:

1. An acetyl globin soluble in water at any pH value between pH 6.7 and pH 9.5.

2. An acetyl globin soluble in water at a pH between pH 7.0 and pH 9.5 and which contains at least seven acetyl groups per globin molecule.

3. An acetyl globin soluble in water at pH 7.4 and having a molecular weight in the order of 34,000.

4. The method of forming an acetyl globin comprising, periodically adding increments of acetic anhydride to an aqueous globin suspension and alternately adjusting the hydrogen ion concentration thereof to substantially pH 8, this two-step cycle of operation being carried out at a temperature range of 0° to 3° C. and until such time as a substantially clear solution of acetyl globin has been obtained.

5. An acetyl globin soluble in water at a hydrogen ion concentration of 7.4 and containing at least 0.9 per cent acetyl radicals.

6. An acetyl globin soluble in water at pH values of 7.4 and above.

HERMAN N. BENIAMS.

No references cited.